(12) United States Patent
Li et al.

(10) Patent No.: US 12,146,653 B2
(45) Date of Patent: Nov. 19, 2024

(54) LIGHTING UNIT HAVING AN LED ARRAY AND LENS PLATE WITH GROOVES

(71) Applicant: SIGNIFY HOLDING B.V., Eindhoven (NL)

(72) Inventors: Yun Li, Shanghai (CN); Jun Lu, Shanghai (CN); Hang Li, Shanghai (CN); Andrew Christanto, Shanghai (CN); Ximei Lian, Shanghai (CN); Weihua Miao, Shanghai (CN); Shengfeng Li, Shanghai (CN); Shelley Sj Cao, Shanghai (CN); Xueqin Lin, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/014,544

(22) PCT Filed: Jul. 13, 2021

(86) PCT No.: PCT/EP2021/069384
§ 371 (c)(1),
(2) Date: Jan. 5, 2023

(87) PCT Pub. No.: WO2022/013174
PCT Pub. Date: Jan. 20, 2022

(65) Prior Publication Data
US 2023/0313968 A1 Oct. 5, 2023

(30) Foreign Application Priority Data

Jul. 17, 2020 (WO) ................ PCT/CN2020/102607
Oct. 15, 2020 (EP) ..................................... 20201978

(51) Int. Cl.
*F21V 5/00* (2018.01)
*F21S 8/04* (2006.01)
(Continued)

(52) U.S. Cl.
CPC ................ *F21V 5/007* (2013.01); *F21S 8/04* (2013.01); *G02B 3/0056* (2013.01); *F21Y 2115/10* (2016.08)

(58) Field of Classification Search
CPC .... F21V 5/007; F21K 9/69; F21S 4/20; F21S 4/28; F21Y 2105/18; F21Y 2105/12
See application file for complete search history.

(56) References Cited

U.S. PATENT DOCUMENTS 6,773,139 B2 * 8/2004 Sommers .............. F21V 19/001
362/240
6,940,660 B2 * 9/2005 Blumel ................... F21V 5/007
359/728
(Continued)

FOREIGN PATENT DOCUMENTS

CN 103824849 A 5/2014
CN 108895313 A 11/2018
(Continued)

OTHER PUBLICATIONS

Choi et al., "Multiple-Viewing-Zone Integral Imaging Using a Dynamic Barrier Array for Three-Dimensional Displays", National Research Laboratory of Holography Technologies, School of Electrical Engineering, Seoul National University, Seoul 151-744, Korea Apr. 21, 2003, vol. 11, No. 8, Opticss Express 927-932.

*Primary Examiner* — Ismael Negron

(57) ABSTRACT

An array of lenslets include a first surface with a plurality of individual cells defining one side of a respect lenslet, a second opposite surface with a set of grooves defining a second side of the array of lenslets. The array of lenslets is a circular arry having a plurality of concentric rings. Each ring includes a plurality of straight segments, and each segment includes lenslets arranged in a row. The lens is disposed over a carrier having an array of light emitting diodes (LEDS) disposed such that some of the LEDs are (Continued)

offset from a center of an associated cell, or a plurality associated with a shared cell and disposed at different positions along a groove direction.

13 Claims, 24 Drawing Sheets

(51) Int. Cl.
  *G02B 3/00*  (2006.01)
  *F21Y 115/10*  (2016.01)

(56) References Cited

U.S. PATENT DOCUMENTS

| | | | |
|---|---|---|---|
| 7,331,681 B2* | 2/2008 | Pohlert | F21V 14/06 |
| | | | 362/17 |
| 8,388,180 B2* | 3/2013 | Chang | F21S 4/28 |
| | | | 362/291 |
| 8,801,223 B2* | 8/2014 | Hsieh | F21V 19/001 |
| | | | 362/249.02 |
| 8,820,963 B2* | 9/2014 | Olsen | F21V 5/002 |
| | | | 362/249.02 |
| 9,039,237 B2* | 5/2015 | Wang He | F21V 5/045 |
| | | | 362/268 |
| 9,217,551 B2* | 12/2015 | Joergensen | F21V 5/007 |
| 11,168,869 B2* | 11/2021 | Pet | F21V 5/002 |
| 11,396,983 B2* | 7/2022 | Qiao | F21K 9/68 |
| 2007/0070624 A1* | 3/2007 | Sun | F21K 9/00 |
| | | | 362/240 |
| 2010/0238668 A1 | 9/2010 | Cheng et al. | |
| 2015/0029718 A1* | 1/2015 | Cook | F21K 9/60 |
| | | | 362/235 |
| 2015/0176823 A1 | 6/2015 | Leshniak et al. | |
| 2016/0077243 A1 | 3/2016 | Ohta et al. | |
| 2016/0320018 A1 | 11/2016 | Gibbs | |
| 2019/0072257 A1 | 3/2019 | Vang et al. | |
| 2020/0217495 A1 | 7/2020 | Shum | |
| 2022/0397259 A1* | 12/2022 | Zhang | F21V 5/007 |

FOREIGN PATENT DOCUMENTS

| | | |
|---|---|---|
| CN | 208652160 U | 3/2019 |
| CN | 209355054 U | 9/2019 |
| WO | 2015100201 A1 | 7/2015 |
| WO | 2019211214 A1 | 11/2019 |

* cited by examiner

| | NB | | |
|---|---|---|---|
| | Specification | 3D Optics | 2.5D Optics |
| Polar Diagram | |  |  |
| $I_0$ | > 900 | 1333 | 1190 |
| Imax | > 900 | 1333 | 1190 |
| Imax at .. Deg | 0-15 deg | 0 | 0 |
| FWHM | 2* 24-30 | 2*25 | 2*28 |
| S/H C | 0.8 - 1.1 | 0.8 | 0.9 |
| S/H L | 0.8 - 1.1 | 0.9 | 0.9 |
| UGRcen | < 22 or 25 | 19 | 20 |
| Smooth beam | | ok | ok |

| | WB | | |
|---|---|---|---|
| | Specification | 3D Optics | 2.5D Optics |
| Polar Diagram | |  |  |
| I₀ | 400-500 | 401 | 407 |
| Imax | < 500 | 390 | 463 |
| Imax at .. Deg | 0-30 deg | 25 | 30 |
| FWHM | 2* 44-50 | 2*47 | 2*43 |
| S/H C | >= 1.4 | 1.6 | 1.5 |
| S/H L | >= 1.4 | 1.7 | 1.5 |
| UGRcen | < 25 | 25 | 25 |
| Smooth beam | | ok | ok |

| Polar Diagram | VWB | | |
|---|---|---|---|
| | Specification | 3D Optics | 2.5D Optics |
| | | (polar diagram) | (polar diagram) |
| $I_0$ | 200-300 | 243 | 227 |
| Imax | <350 | 293 | 250 |
| Imax at .. Deg | 25-45 deg | 42.5 | 45 deg |
| FWHM | 2 * 56-70 | 2*62 | 2 * 60 |
| S/H C | >= 1.8 | 2.0 | 2.2 |
| S/H L | >= 1.8 | 2.1 | 2.2 |
| UGRcen | < 28 | 29 | 29 |
| Smooth beam | | ok | ok |

FIG. 14

|  | NB ||
|---|---|---|
|  | Specification | 2.5D Lens |
| Polar Diagram |  | (polar diagram with rings at 250, 500, 750, 1000, 1250, 1500) |
| LOR |  | 88% |
| $I_0$ | > 900 | 1350 |
| Imax | > 900 | 1350 |
| Imax at .. Deg | 0-15 deg | 0 deg |
| FWHM | 2* 24-30 | 2 * 28 |
| S/H C | 0.8 - 1.1 | 0.9 |
| S/H L | 0.8 - 1.1 | 0.9 |
| UGRcen | < 22 or 25 | 18 |
| Smooth beam |  | ok |

FIG. 21

LIGHTING UNIT HAVING AN LED ARRAY AND LENS PLATE WITH GROOVES

CROSS-REFERENCE TO PRIOR APPLICATIONS

This application is the U.S. National Phase application under 35 U.S.C. § 371 of International Application No. PCT/EP2021/069384, filed on Jul. 13, 2021, which claims the benfits of European Patent Application No. 20201978.2, filed on Oct. 15, 2020, and Chinese Patent Application No. PCT/CN2020/102607, filed on Jul. 17, 2020. These applications are hereby incorporated by reference herein.

FIELD OF THE INVENTION

This invention relates to lens plates, for example for beam shaping the light output from a LED array.

BACKGROUND OF THE INVENTION

An optical lens is widely used to redirect the light emitted from a light source, such as a LED, to create a desired beam shape.

When an array of light sources, such as a LED array, is used to achieve a high output lumen, it is common to use a lens plate consisting many small optical lenses, i.e. lenslets. Each lenslet is for example positioning over a respective light source, for example to convert a Lambertian light output distribution of a LED to a desired beam shape.

Different light source designs, such as different LED boards even with the same form factor, may have different numbers of light sources due to the different lumen package requirements of the luminaire in which the light source is to be used.

With the continuing improvement of LED efficiency, the required number of the LEDs on a board of a given size is typically reducing over time. As a result, different lens plates are typically developed for successive designs of LED boards, wherein the LED boards having different LED quantities and positions and the lens plates are designed to match.

The need to redesign the lens plate increases the lead time, gives extra tooling costs, and increases the number of stock keeping units.

SUMMARY OF THE INVENTION

According to examples in accordance with an aspect of the invention, there is provided a lens plate comprising an array of lenslets, comprising:
- a first surface comprising a plurality of individual cells, each cell delimiting one side of a respective lenslet of the array of lenslets; and
- a second surface comprising a set of grooves, each groove delimiting a second, opposite side, of a sub-array of the lenslets of the array of lenslets;
- wherein the array of lenslets is a circular array comprising a plurality of concentric rings, each ring comprising a plurality of straight segments, and each segment comprising multiple said lenslets arranged in a row.

Each lenslet of known lens plates typically has a generally part-spherical convex upper (light output) surface, and a generally part-spherical concave lower (light entrance) surface. Each lenslet is put on top of an associated LED to transfer the Lambertian light distribution of LED to various beam shapes.

The invention instead makes use of a groove structure at the second (light entrance) surface. The cross sectional shape along the groove (perpendicular to the elongate direction of the segment) is constant along the elongate direction of the segment.

Each cell may intersect with at least some of the neighboring cells (e.g. along a line) so that a small pitch is provided between those neighboring cells. The cells are thus tightly packed, so that there is a large set of lenslet positions. This means that a LED board may be used with LEDs at a sub-set of those lenslet positions. This gives flexibility in the choice of the quantity of LEDs to be used with the lens plate.

The cells of the first surface combine with the grooves of the second surface to define a desired function for the lenslet, such as a narrow beam, wide beam or very wide beam lens function. Other light distributions may also be achieved such as asymmetric light distributions.

The grooves and the associated cells may be formed in straight lines, but they may instead also follow curved paths. The grooves then have a constant cross sectional shape perpendicular to that curved path at any given position along the curved path.

Each cell is for example positioned aligned with a respective groove, along an optical axis of the lens plate. Thus, the grooves and cells are on opposite sides of the lens plate, and the optical axis is in the normal direction through the lens plate between the two surfaces.

The first surface is for example a light output surface and the second surface is a light input surface. The light input surface may be considered to be the bottom face of the lenslet and the light output surface may be considered to be the top face of the lenslet.

Each of the cells for example has a convex (outer) surface. This provides a focusing function, to create a more desired beam shape from the incident light.

The lenslets may each occupy an area of less than 8 mm×8 mm. The optics are made as small as possible while meeting the etendue requirements. This means that within the same form factor, more lenslets can be integrated, so the maximum number of LEDs on an underlying the LED board increases. However, it is not necessary to have LEDs beneath every lenslet. The same design of lens plate may be used with a LED board having fewer LEDs, by arranging the LEDs in a repeating pattern beneath the lenslets. Thus, the lens plate is compatible with various LED board designs. This greatly saves the lead time for developing new lens plate optics and the cost of opening a new injection tooling for each LED board. The lenslets may for example occupy an area of 6 mm×6 mm.

In one example of the lens plate, the segments are arranged substantially in a circumferential direction of the rings. In another example of the lens plate, the segments are arranged substantially in a radial direction of the rings.

It is preferable that profiles of the cells are substantially the same. In other words, all the cells have a same shape, thus the designing effort for the optical structure can be greatly reduced.

In a preferable example, each of the cells has a convex surface facing both circumferential and radial directions of the lens plate. This means that the cells have the shape of a 3D protrusion.

In other examples, the lens plate may be circular or indeed have another shape.

The lens plate is for example injection molded. The use of grooves (which may be considered to be 2D structures) opposing the cells (which may be considered to be 3D shapes) allows for easier alignment between the top and bottom mold parts and enables simpler tooling for the bottom mold part.

The lens plate is also less sensitive to the positioning over an LED board because along the groove direction, a position shift of the LEDs does not risk interfering with the lens plate. For lens plates with small pitch and large numbers of small lenslets, this gives a further advantage.

The lens plate may be round, for example to form a high bay luminaire.

The row pitch in the segment is for example in the range 5 mm to 15 mm. One current common row pitch for a LED array is for example 10.5 mm, but the invention may be scaled to various sizes.

Each lenslet may for example define a narrow beam lens function, for example with a full width at half maximum between ±24 degrees and ±30 degrees. Each lenslet may instead define a wide beam lens function, for example with a full width at half maximum between ±44 degrees and ±50 degrees. Each lenslet may instead example define a very wide beam lens function, for example with a full width at half maximum between ±56 degrees and ±70 degrees.

Different lens plates may be made to different designs, by providing a fixed design of the grooved second surface, and choosing a suitable cell design of the first surface.

The invention also provides a lighting unit comprising:
an array of LEDs mounted on a carrier; and
the lens plate as defined above disposed over the carrier, wherein each of the LEDs faces a groove of the lens plate.

The carrier is for example a printed circuit board. The cells of the lenslets (or a sub-set of the lenslets) are aligned with the LEDs beneath.

Each of the LEDs may be aligned with a center of an associated cell.

Instead, at least some of the LEDs may be offset from center of an associated cell. This may be used to provide a beam shaping function.

Furthermore, for at least some of the cells, a plurality of LEDs may be associated with a shared associated cell, with the LEDs at different positions along a groove direction. This provides further options for beam shaping.

The array of LEDs may have a same number of LEDs as the number of lenslets of the lens plate. This represents a maximum LED capacity for the particular lens plate design. In such a case, each of the LEDs faces a corresponding lenslet of the lens plate.

Alternatively, the LEDs of the array of LEDs may be associated with a subset of the array of lenslets of the lens plate, e.g., a segment. Thus, the LED board has fewer LEDs than the maximum LED capacity. The same lens plate may be used with different LED board designs.

The LEDs of the array of LEDs may be associated with one of:
a sub-set of the segments of lenslets;
a sub-set of the rings of lenslets;
all of the segments of lenslets but with each segment of LEDs having LEDs associated with only a sub-set of the lenslets of a corresponding segment of lenslets.

Thus, the partial usage of the lenslets may be based on using only some of the segments, or only some of rings, or a checker-board pattern, or another pattern of unused lenslets spread across the area of the lens plate.

The invention also provides a high bay luminaire comprising the lighting unit defined above and a LED driver.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 14 shows a comparison of the optical performance of the design of the very wide beam lens design FIG. 10 and a conventional lenslet design;

FIG. 21 shows a simulation of the performance a narrow beam implementation; and

DETAILED DESCRIPTION OF THE EMBODIMENTS

Figure 1:
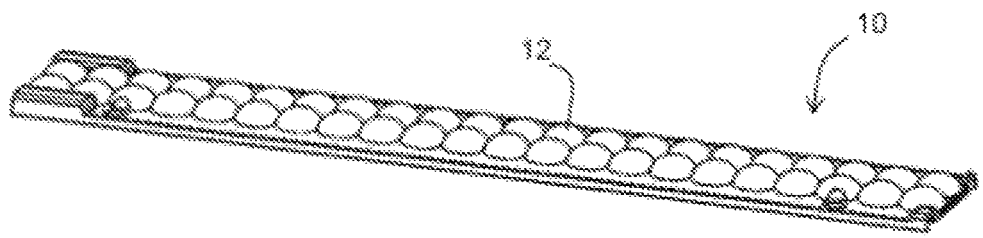
FIG. 1 shows a known lens plate design in perspective view.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lens plate having an array of lenslets. A first surface comprises a plurality of individual cells, each cell delimiting one side of a respective lenslet of the array. A second opposite surface comprises a set of grooves, each groove delimiting a second, opposite side, of a sub-array of the lenslets of the array of lenslets. The lens plate design thus combines grooves on one side which cover multiple lenslets and a cellular lens structure on the opposite side.

FIG. 1 shows a known lens plate design in perspective view. The lens plate 10 comprises an array of lenslets 12. Each lenslet 12 is for positioning over a LED of an underlying LED board. Each lenslet for example has a convex (outwardly bowed) upper surface and a concave (inwardly bowed) lower surface.

Different lens plates are designed for different LED boards with a different number and layout of LEDs.

Figure 2:
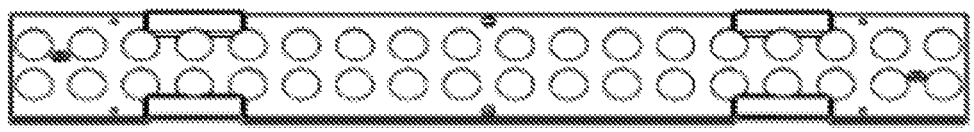
FIG. 2 shows some further examples of conventional lens plates in plan view.
Figure 2:
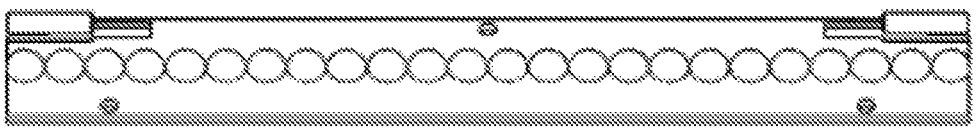
Figure 2:
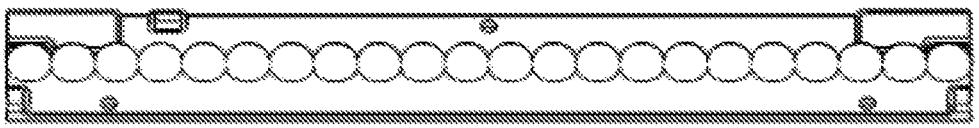

FIG. 2 shows some further examples of conventional lens plates in plan view. They are for example all of 30 cm length and designed to output a wide beam. The top example is for 36 LEDs (two rows of 18), the middle example is for 24 LEDs (one row of 24) and the bottom example is for 22 LEDs (one row of 22).

Figure 3:
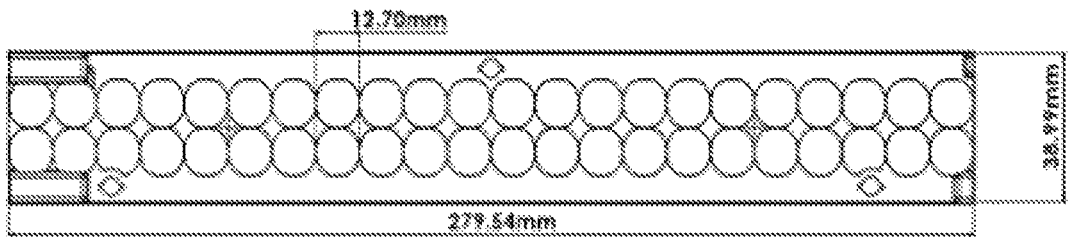
FIG. 3 shows the dimensions of the known lens plate of FIG. 1.

FIG. 3 shows example dimensions for the known lens plate of FIG. 1. The diameter of each individual lenslet is 12.7 mm, and the size of the plate is 279.54 mm by 38.99 mm.

Figure 4:
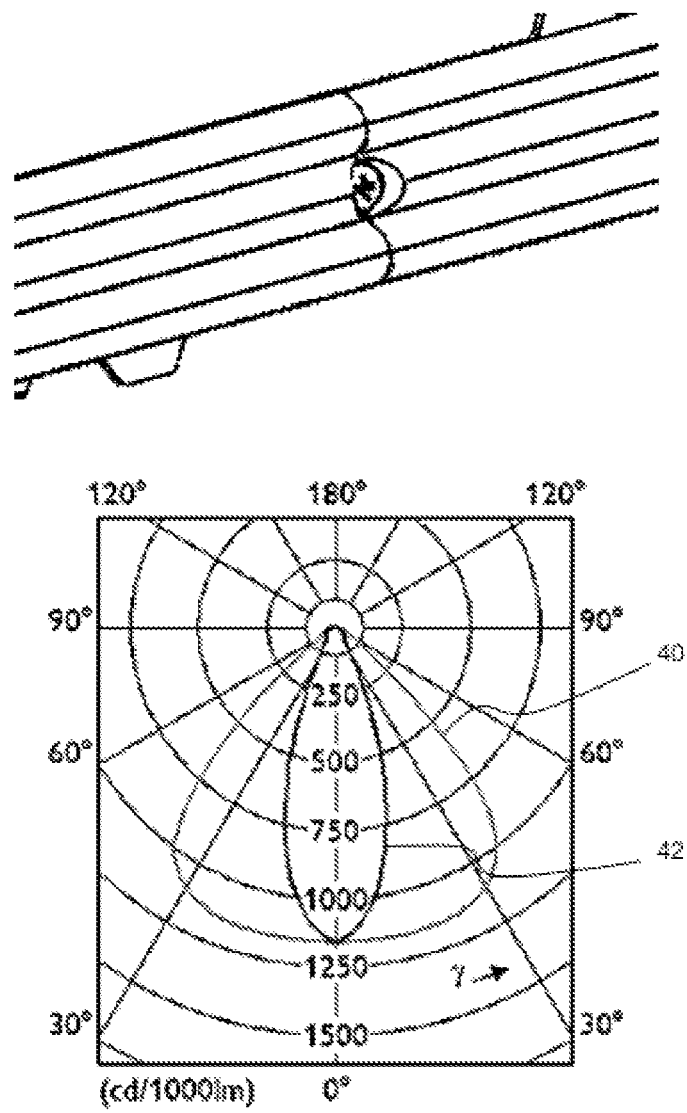
FIG. 4 shows another known lens plate, for example for a high rack optic.

FIG. 4 shows another known lens plate, for example for a high rack optic, in which the first and second surfaces comprise an elongate ridge and a groove, each with constant cross section along their length. The light distribution pattern is shown, where plot 40 is the light intensity distribution in the lengthwise direction and plot 42 is the light intensity distribution in the widthwise direction.

In this design, there are grooves underneath and ridges over the top. The LEDs need to be arranged in rows with a same pitch as the pitch of the grooves/ridges. In the lengthwise direction, the position and number of LED will not impact the light distribution. As a result, this lens plate design may be used for different designs of LED board, with a different LED quantity, as long as the pitch of the LEDs in the crosswise direction is kept the same.

However, it is impossible for such a lens, which may be considered to be a 2D lens, to control the light output shape in the lengthwise direction. It is only suitable for some light distributions. It is difficult to achieve some beam shapes such as a narrow beam or a very wide beam.

The invention combines a groove structure at one side of the lens plate with a cell structure on the other side of the lens plate. This achieves almost all the required beam shapes, while maintaining a certain level of flexibility in the selection of the quality of LEDs on the LED board. A cell structure has individual cells, with a cross sectional shape that varies along the length direction.

A first way to provide flexibility to apply the lens plate to different LED boards is to design the lenslets as small as possible. Within a given form factor, more lenslets can then be integrated, so the maximum number of LEDs on the LED board increases. It is not necessary to provide LEDs beneath every lenslet. Thus, when the required quantity of LEDs on the LED board is less than the maximum number, the same lens plate may be used, and depending on the number of LEDs required, the LEDs can be positioned beneath a sub-set of the lenslets. A regular distribution of the used/unused lenslets across the area of the lens plate may be used to maintain light output uniformity. In this way, a certain level of freedom is achieved for the LED quantity.

For example, a minimum size of lenslet may be calculated to achieve a desired etendue.

The etendue for a flat surface with uniform divergence angle is given by:

$$E=\pi A \sin^2(\theta_{1/2})$$

Figure 5:
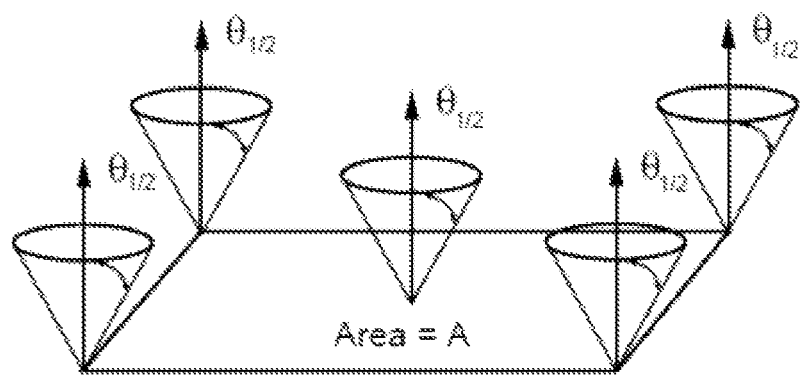
FIG. 5 is used to explain how a minimum lenslet size may be determined.

The value $\theta_{1/2}$ is the half angle of the light beam and the value A is the area of light emission. These parameters are shown in FIG. 5.

For one example, the LED area may be 3 mm×3 mm=9 mm$^2$.

The LED etendue is then given by:

$$E_{LED}=\pi*9*\sin^2(90°)=28.3 \text{ mm}^2 \text{ steradian.}$$

The lenslet requires the same etendue.

Hence, the lenslet etendue is given by:

$$E_{LENSLET}=E_{LED}=\pi A_{LENSLET} \sin^2(\theta_{LENSLET}/2)$$

For a narrow beam, $\theta_{LENSLET}=60°$.

This gives A=28.3/π/(sin$^2$(60°/2))=36 mm$^2$.

This shows that the required linear size of the lenslet in this example is 6 mm to preserve the light output from an LED of area 3 mm×3 mm and when generating a narrow beam. This is just one example, to show the approximate minimum lenslet size that is appropriate for a real example of LED board.

The invention provides a lens plate design with a first surface comprising a plurality of individual cells, each cell delimiting one side of a respective lenslet of the array of lenslets and a second surface comprising a set of grooves, each groove delimiting a second, opposite side, of a sub-array of the lenslets of the array of lenslets. Thus, the groove extends along the path of multiple lenslets.

Figure 6:
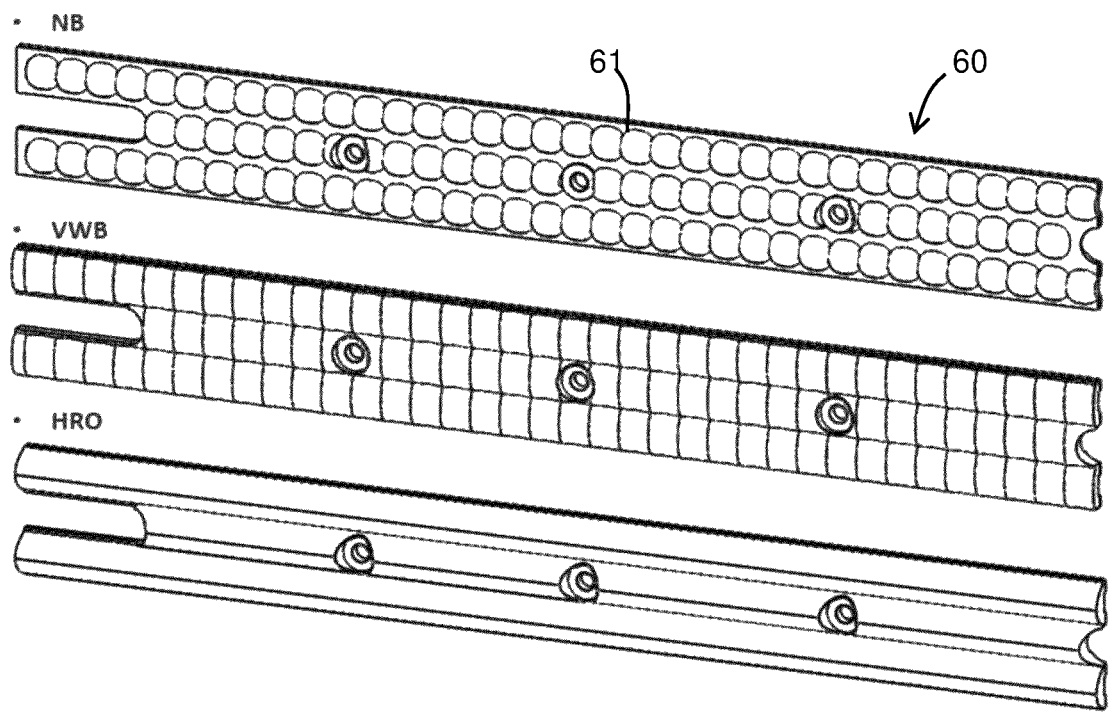
FIG. 6 shows two examples of the first surface in accordance with the invention and a third additional example.

FIG. 6 shows two examples of the first surface 60 which may be used in accordance with the invention and a third additional example. In all cases, the lens plate has three rows of lens structures.

The top example shows lenslets for producing a narrow beam, and the middle example shows lenslets for producing a very wide beam.

In both examples, each lenslet is defined by an individual cell 61. Each cell 61 in this example intersects with neighboring cells. By this is meant there is no spacing between lenslets in at least one direction. For example, the narrow beam lenslets in the top image contact each other in the row direction, and the very wide beam lenslets in the second image contact each other in both the row and column directions. The cells are thus as tightly packed as they can be at least in one direction, so that there is a large set of lenslet positions. This means that a LED board may be used with LEDs at a sub-set of those lenslet positions. This gives flexibility in the choice of the quantity of LEDs to be used with the lens plate.

The bottom example has ridges instead of individual cells. It is shown because the lens plate design may use the same second surface and hence it may also share tooling parts with the designs for the top two images.

Figure 7:
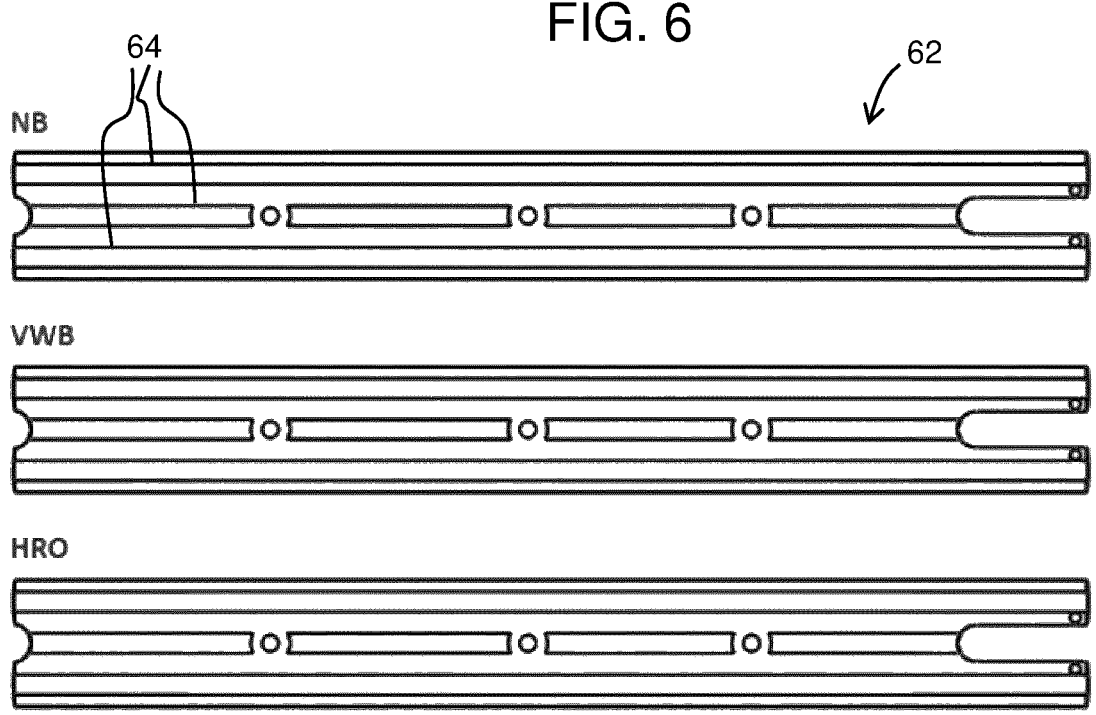
FIG. 7 shows the second surface for the three lenslet designs of FIG. 6.

FIG. 7 shows the second (bottom) surface 62 for the three lenslet designs of FIG. 6. The bottom surface is identical between the three designs, and comprises the groove structure comprising elongate grooves 64. The cross sectional shape along the groove (with the cross section perpendicular to the length direction) is constant along the length.

The cells of the first surface combine with the grooves of the second surface to define a desired function for the lenslet, such as a narrow beam, wide beam or very wide beam lens function.

Each of the individual cells is aligned with a respective groove 64, along an optical axis of the lens plate (i.e. in a normal direction through the lens plate, perpendicular to a general plane of the first and second surfaces). Thus, the grooves and cells are on opposite sides of the lens plate, and the optical axis is in the normal direction through the lens plate between the two surfaces.

The first surface is the light output surface (e.g. the top surface) and the second surface is the light input surface (e.g. the bottom surface), typically for receiving light from a LED. Each of the cells has a convex outer surface. This provides a focusing function.

FIGS. 6 and 7 shows that the plate is typically an elongate body having a length and a width. The grooves extend along the length of the second surface of the lens plate. The first surface may then comprise a plurality of rows and columns of the cells, the rows extending along the length of the lens plate and the columns extending across the width of the lens plate. Each groove is opposite a respective row of the cells such that each lenslet is defined by a cell and a portion of the respective groove.

The rows and the grooves are preferably straight, so that the second surface has a constant cross sectional shape along the length of the lens plate. The lens plate is for example injection molded. The use of straight grooves allows for easier alignment between the top and bottom mold parts and thus enables simpler tooling. The lens plate is also less sensitive to the positioning over an LED board.

Figure 8:
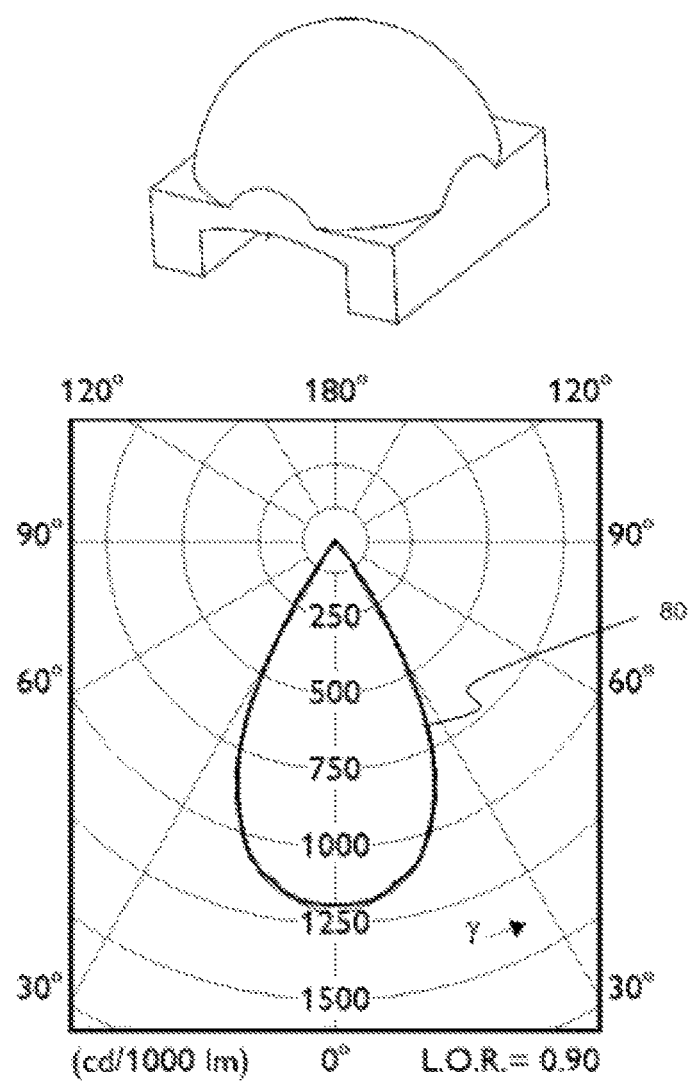
FIG. 8 shows a lenslet design for a narrow beam output and shows the light intensity distribution.

FIG. 8 shows a lenslet design for a narrow beam and shows the light intensity distribution. A narrow beam lens function for example corresponds to a full width at half maximum between ±24 degrees and ±30 degrees.

The plot 80 shows the light distribution pattern for the lengthwise direction and for the widthwise direction (as they substantially overlap).

Figure 9:
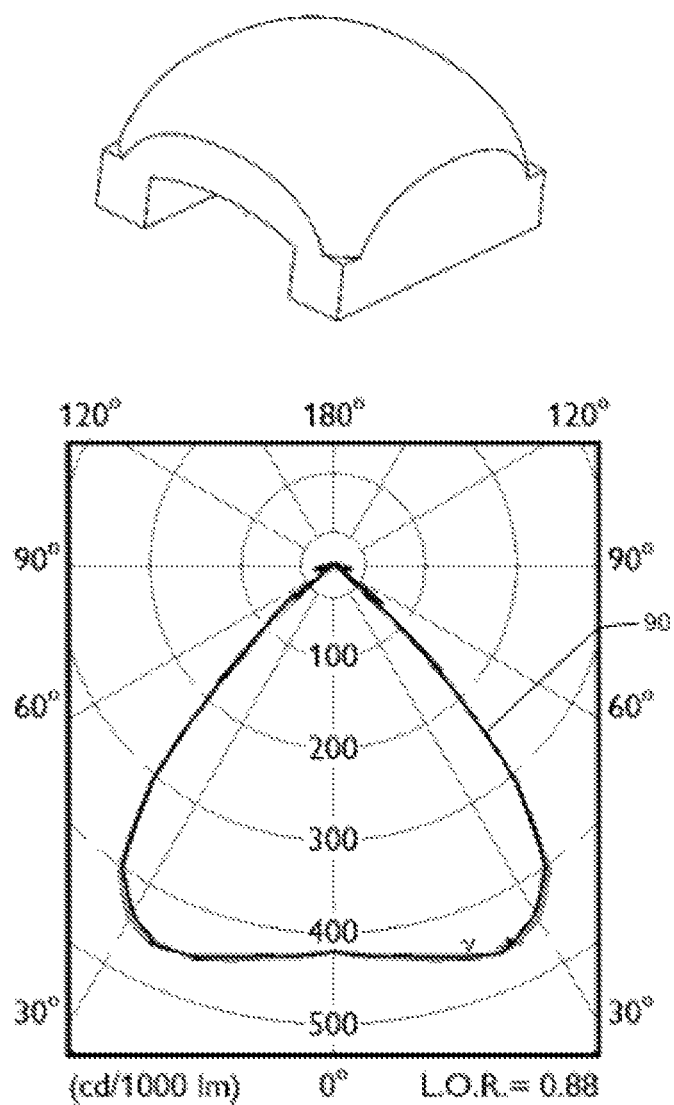
FIG. 9 shows a lenslet design for a wide beam output and shows the light intensity distribution.

FIG. 9 shows a lenslet design for a wide beam and shows the light intensity distribution. A wide beam lens function for example corresponds to a full width at half maximum between ±44 degrees and ±50 degrees.

The plot 90 shows the light distribution pattern for the lengthwise direction and for the widthwise direction (as they substantially overlap).

Figure 10:
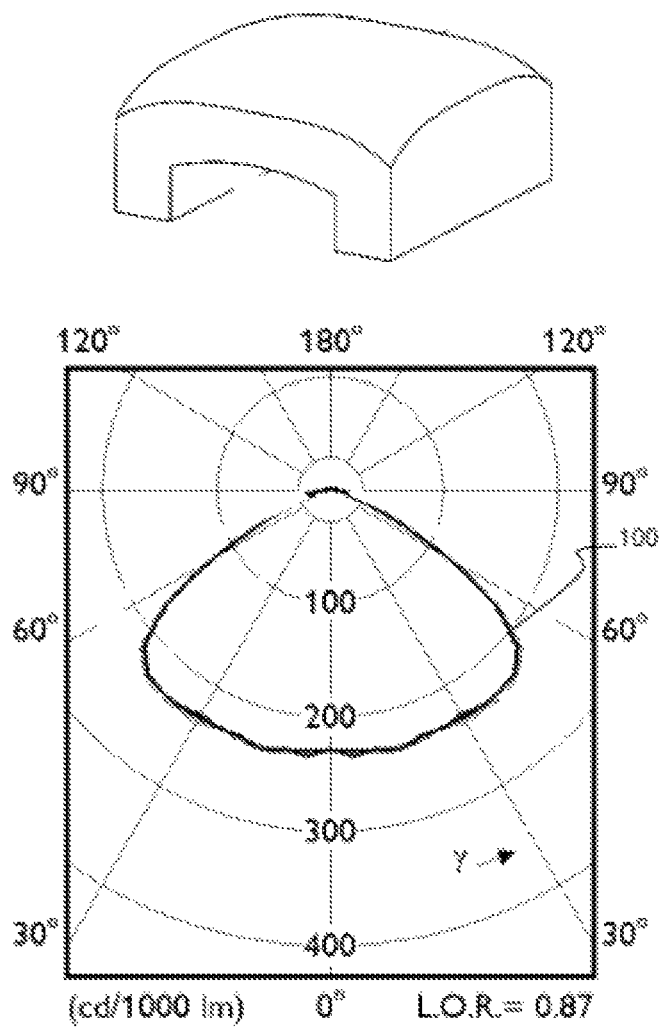
FIG. 10 shows a lenslet design for a very wide beam output and shows the light intensity distribution.

FIG. 10 shows a lenslet design for a very wide beam and shows the light intensity distribution. A very wide beam lens function for example corresponds to a full width at half maximum between ±56 degrees and ±70 degrees.

The plot 100 shows the light distribution pattern for the lengthwise direction and for the widthwise direction (as they substantially overlap).

The designs of FIGS. 8 to 10 all have the same second (bottom) surface design. Thus, different lens plates may be made to different designs, by providing a fixed design of the grooved second surface, and choosing a suitable cell design of the first surface.

As mentioned above, a further lens plate design may again use the same grooved second surface, but with of rows of ridges forming the first surface extending along the length of the lens plate, with a respective groove beneath each ridge. This defines for example a cylinder lens design, which shares the design of the second surface with the lens plate designs of the invention.

Figure 11:
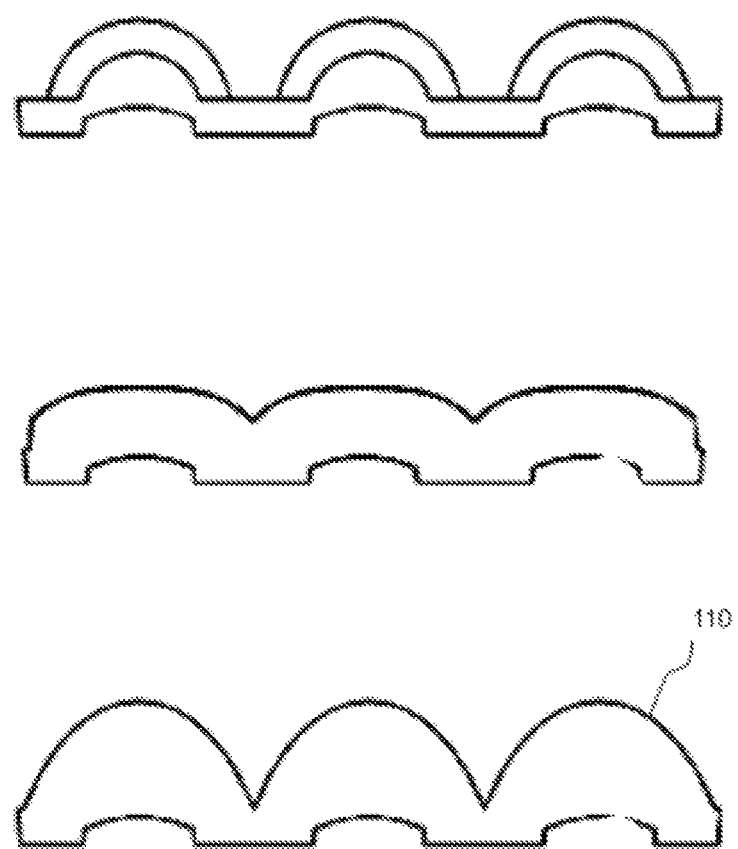
FIG. 11 shows the lens plates of FIGS. 6 to 7 in cross section.

FIG. 11 shows the various possible lens plates in cross section. The cells 61 of the first surface 60 and the grooves 64 of the second surface 62 are shown. The top image is for the narrow beam design of FIG. 8, the middle image is for the very wide beam design of FIG. 10 and the bottom image for the additional design with parallel ridges 110 on the first surface and grooves 64 on the second surface, so the cross section shown is constant along the length.

Figure 12:
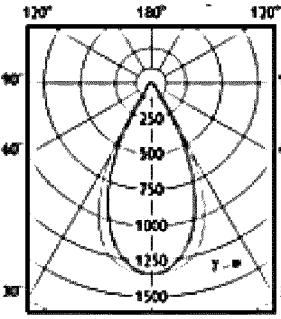
FIG. 12 shows a comparison of the optical performance of the design of the narrow beam lens design FIG. 8 and a conventional lenslet design.
Figure 12:
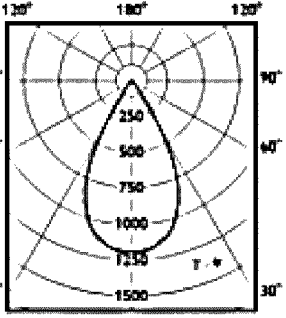

FIG. 12 shows a comparison of the optical performance of the design of the narrow beam ("NB") lens design FIG. 8 (the right column, "2.5D Optics") and a conventional lenslet design (the column "3D Optics") to achieve the same output. The term 2.5D is used to denote the linear groove structure combined with the 3D cellular structure.

Figure 13:
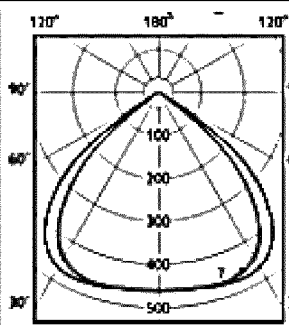
FIG. 13 shows a comparison of the optical performance of the design of the wide beam lens design FIG. 9 and a conventional lenslet design.
Figure 13:
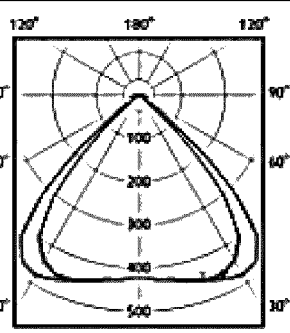

FIG. 13 shows a comparison of the optical performance of the design of the wide beam ("WB") lens design FIG. 9 (the right column, "2.5D Optics") and the conventional lenslet design (the column "3D Optics") to achieve the same output.

FIG. 14 shows a comparison of the optical performance of the design of the very wide beam ("VWB") lens design FIG. 10 (the right column, "2.5D Optics") and the conventional lenslet design (the column "3D Optics") to achieve the same output.

The lens plate design of the invention, based on a lenslet size of 6 mm×6 mm, achieves all the basic optical performance requirements.

Figure 15:
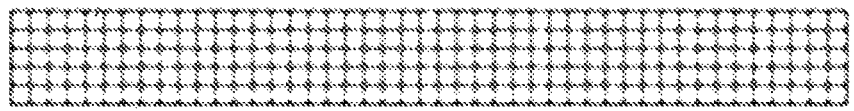
FIG. 15 shows another lens plate design.

FIG. 15 shows another design of lens plate 10, with five rows of 45 lenslets 12 of dimensions 6 mm×6 mm, thus with a maximum LED capacity of 225 LEDs, and fitting within an overall dimension of 270 mm×30 mm.

Figure 16:
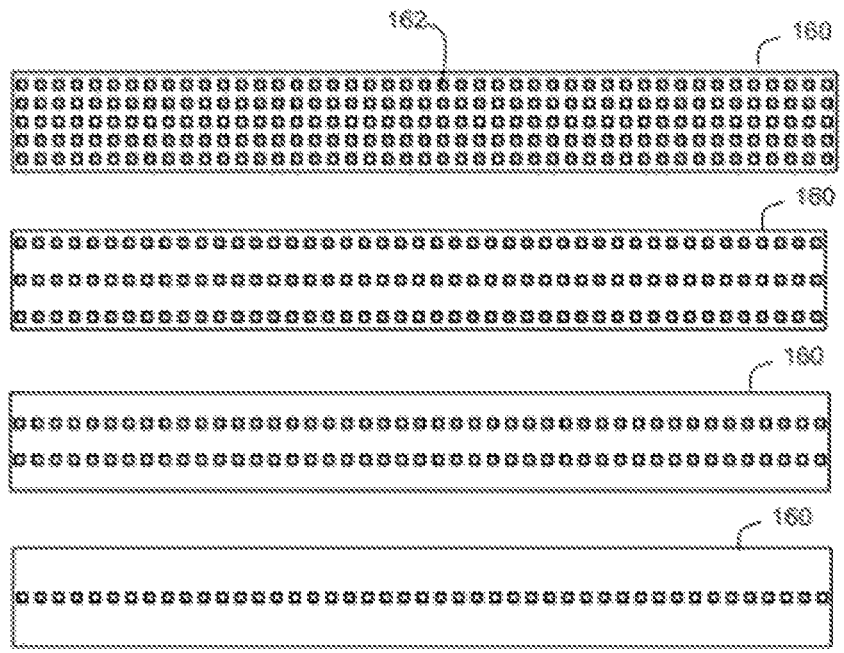
FIG. 16 shows various examples of LED board, with different LED quantities, which may be used with the lens plate of FIG. 15.

FIG. 16 shows various examples of LED board 160 each carrying an array of LEDs 162, with different LED quantities, which may be used with the lens plate of FIG. 15.

The top image shows a LED board 160 with the full capacity of 225 LEDs. The second image shows the use of alternate rows of the lenslets, so there are three rows of 45 LEDs, hence 135 LEDs.

The third image shows the use of only two rows of the lenslets, so there are two rows of 45 LEDs, hence 90 LEDs.

The bottom image shows the use of only one row of lenslets, so there is one row of 45 LEDs.

In these last three examples, the LEDs of the array of LEDs are associated with a sub-set of the rows of lenslets.

Figure 17:
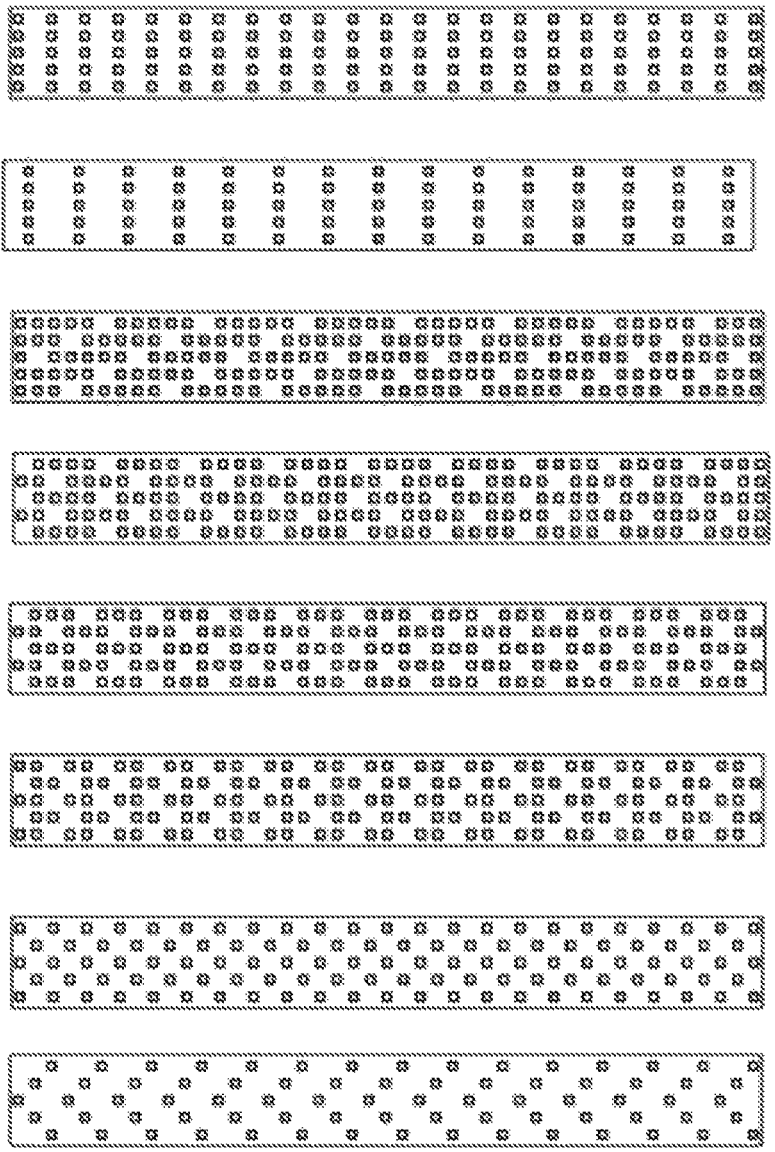
FIG. 17 shows various further example of LED board, with different LED quantities, which may be used with the lens plate of FIG. 15.

FIG. 17 shows various further example of LED board 160, with different LED quantities, which may be used with the lens plate of FIG. 15.

The top image shows the use of alternate columns of the lenslets, so there are 23 columns of five LEDs, hence 115 LEDs.

The second image shows the use of even further spaced columns (one in every three) of the lenslets, so there are 15 columns of five LEDs, hence 75 LEDs.

In these first two examples, the LEDs of the array of LEDs are associated with a sub-set of the columns of lenslets.

The last six examples show LED board layouts where the LEDs are associated with all of the rows and columns of lenslets but with each row of LEDs having LEDs associated with only a subset of the lenslets of a corresponding row of lenslets.

The number of LEDs in these six examples are 189, 180, 167, 150, 113 and 75.

The pattern of unused lenslets (and hence also the pattern of used lenslets) is preferably as uniform as possible along the length. To achieve this, it follows a repeating pattern, and the length of the repetition is as short as possible. Each row of LEDs preferably has the same number of LEDs so the pattern of unused LEDs is distributed evenly between the rows.

Figure 18:
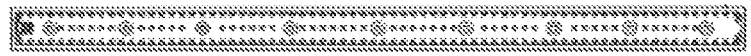
FIG. 18 shows another (existing) LED board design.
Figure 19:
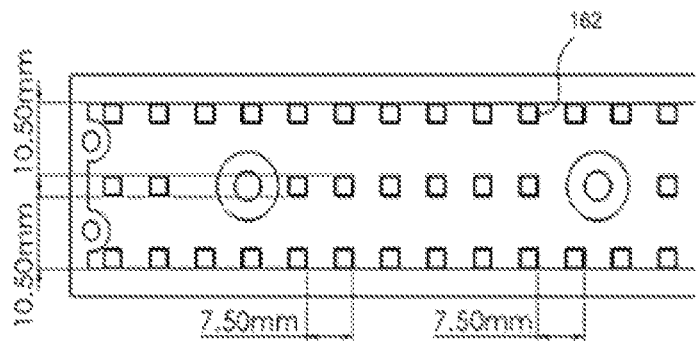
FIG. 19 shows the board dimensions in more detail.

FIG. 18 shows another (existing) LED board design 160 and FIG. 19 shows the board dimensions in more detail. The LED board 160 has a row pitch of 10.5 mm and a 7.5 mm pitch in lengthwise direction. The maximum number of LEDs 162 in this case is 192 (after leaving place for connectors and screw holes as shown).

The lens plate can thus be designed for this LED board by imposing a size limitation 10.5 mm×7.5 mm for the lenslets.

The resulting design is for example as shown in FIGS. 6 and 7. The lens plates are for example 300 mm long, but multiple lens plates may be connected end to end.

Figure 20:
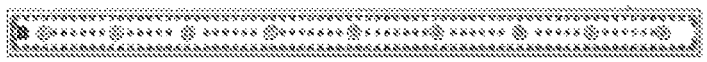
FIG. 20 shows possible LED layouts that are compatible with a lens plate based on the LED board of FIG. 18.
Figure 20:
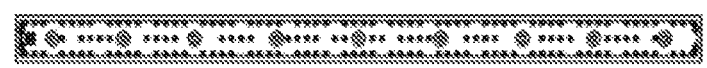
Figure 20:
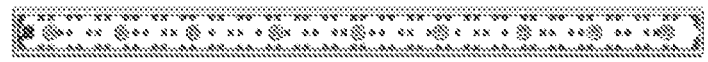
Figure 20:
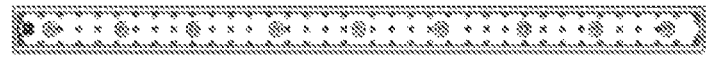
Figure 20:
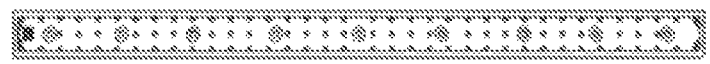

FIG. 20 shows possible LED layouts that are compatible with such a lens plate.

All three rows of lenslets are used in all five examples.

The top image shows the maximum capacity of 192 LEDs (corresponding to FIG. 18). The next images shows 154, 130, 98 and 66 LEDs. The first two images shows lenslets omitted from rows and columns in a pattern, and last two images show the omission of columns of lenslets. Thus, if the required number of LEDs reduces, the same lens plate may be used with a new design of LED board.

Figure 22:
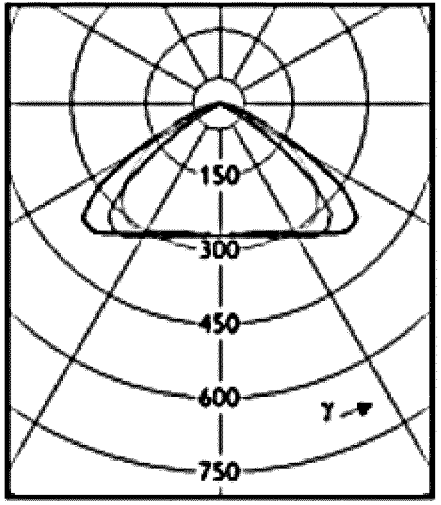
FIG. 22 shows a simulation of the performance a very wide beam implementation.

FIG. 21 shows a simulation of the performance a narrow beam implementation and FIG. 22 shows a simulation of the performance a very wide beam implementation. The simulation is based on the use of the maximum capacity of LEDs. Both designs again meet the main performance requirements.

Some designs do not meet the desired Unified Glare Rating (UGR) requirements specified in the tables. In particular, it is difficult for a very wide lens beam to achieve an output with a desired UGR. This can, if desired, be compensated by the luminaire design.

In the examples above, the LEDs are each aligned with a center of a corresponding lenslet. However, there may be a deliberate offset of the LED, along a direction of the groove of the second surface, with respect to the center of the lenslet.

Figure 23:
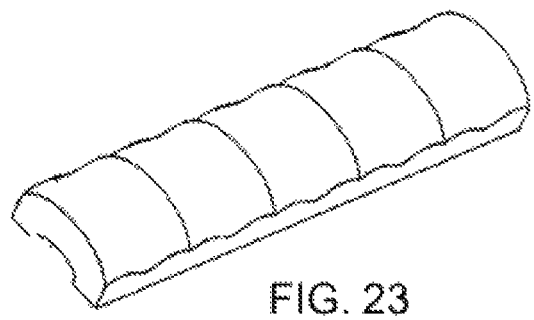
FIG. 23 shows a line of five very wide beam lenslets of the type shown in FIG. 10.

FIG. 23 shows a line of five very wide beam lenslets of the type shown in FIG. 10, formed by top cells 61 and a bottom groove 64. They for example have a dimension of 11 mm×11 mm.

Figure 24:
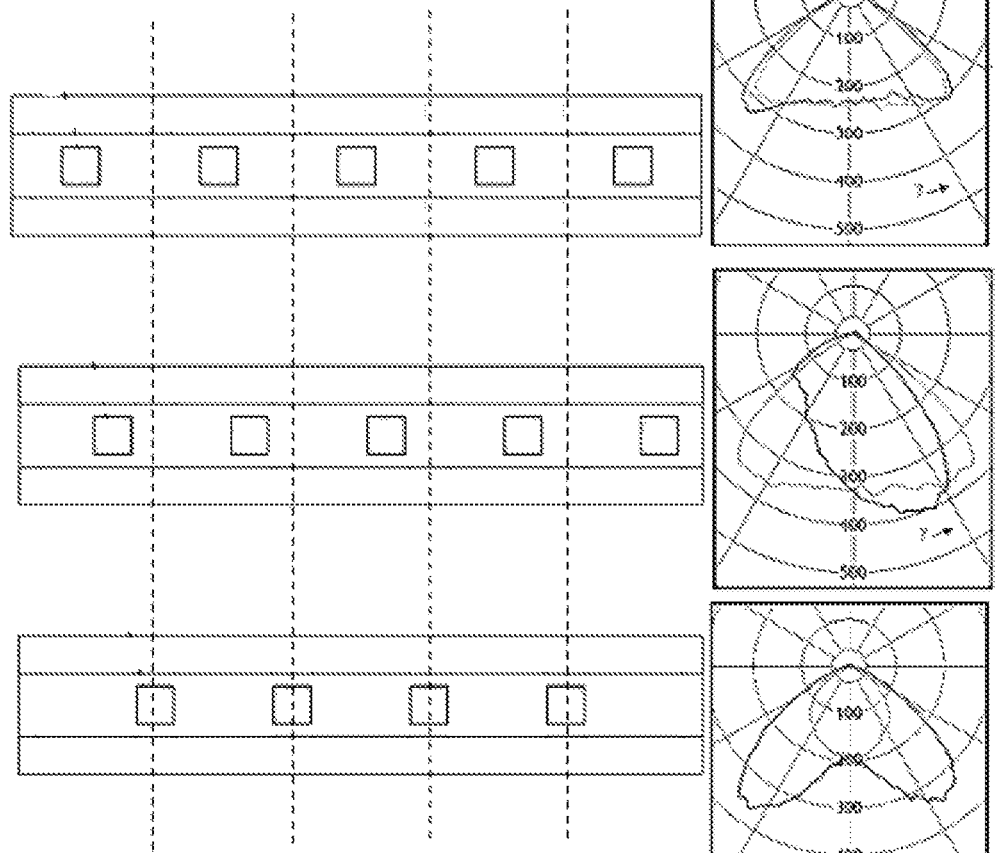
FIG. 24 shows three different relative positions between each LED and the associated lenslet of FIG. 23, and the corresponding light intensity distribution.

FIG. 24 shows three different relative positions between each LED and the associated lenslet of FIG. 23, and also shows the corresponding light intensity distribution. The dotted lines represent the positions of the junctions between adjacent lenslets, i.e. between the cells 61. The LEDs have a 11 mm pitch.

The top image shows the LEDs 162 aligned with the center of each lenslet. The light intensity distribution basically corresponds to the very wide beam distribution of FIG. 10 (but the lenslets are larger in this example giving a slightly different distribution).

The middle image shows the LEDs 162 moved away from the center of each lenslet and the junction between cells 61, in particular shifted by 2 mm. The light intensity distribution shows an asymmetrical beam in the (vertical) plane including the length direction of the line of lenslets. Thus, the shifting of the LED position along the groove steers the beam output along the groove direction. The light intensity distribution remains symmetrical in the plane including the width direction across the lenslets.

The bottom image shows the LEDs 162 positioned at the junction line, hence shifted by 5.5 mm. The light intensity distribution shows a double asymmetrical beam in the (vertical) plane including the length direction of the line of lenslets. Thus, the shifting of the LED position along the groove to the junction creates two beams, one through each of the adjacent lenslets, in the groove length direction. The light intensity distribution remains symmetrical in the plane including the width direction across the lenslets (because the arrangement is still symmetrical in the width direction).

The LEDs may all have the same relative positions, but different relative positions may be combined to provide a desired overall output beam pattern. A same LED board may thus be used with a same lens plate to achieve different light intensity distributions.

The examples above all have a lenslet above (at most) one LED. There may instead be multiple LEDs along the groove direction of a single lenslet.

Figure 25:
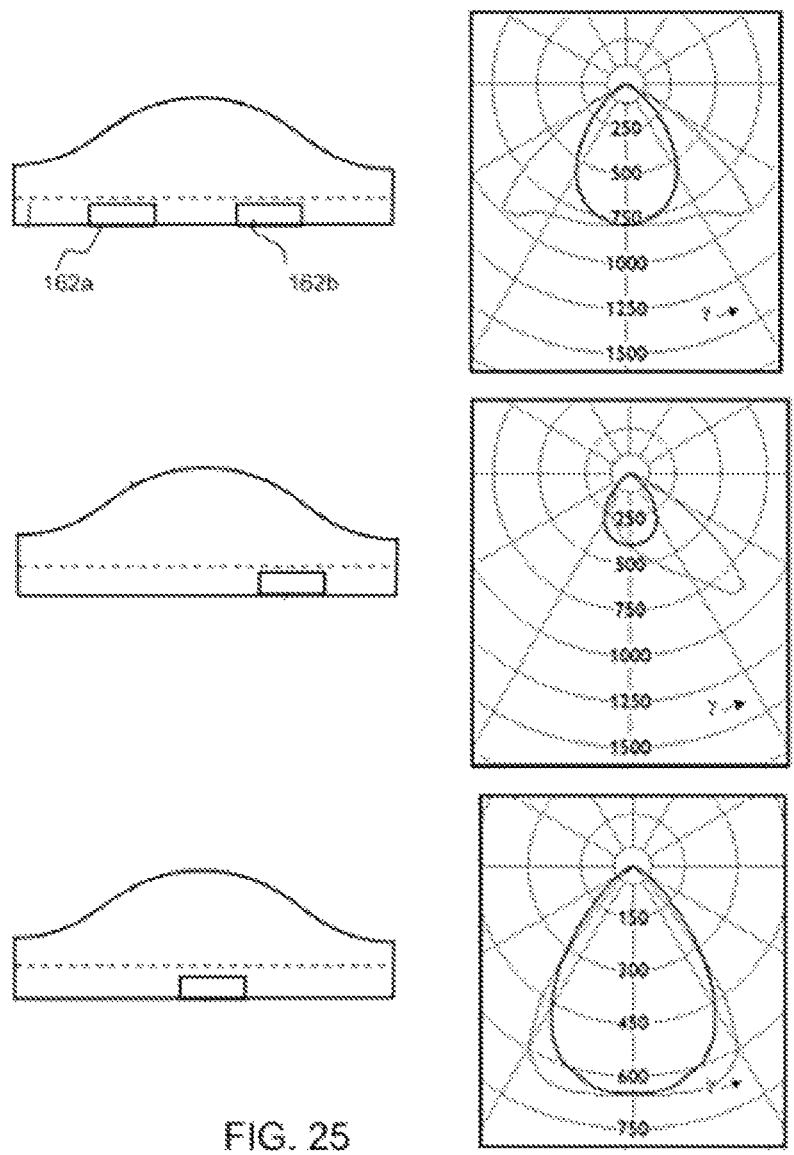
FIG. 25 shows three different LED arrangements based on a narrow beam lenslet, and shows the intensity distribution.

FIG. 25 shows three different LED arrangements based on a narrow beam lenslet, and shows the intensity distributions. This lenslet does not have a unity form factor; it is 22 mm (in the groove direction)×10 mm (in the width direction).

The top image shows two LEDs 162*a*, 162*b* along the groove 64 beneath a single lenslet cell 61. The light intensity distribution shows a widened beam in the (vertical) plane including the length direction of the line of lenslets. Thus, the use of two LEDs position along the groove creates a wide beam in the length direction.

The middle image shows a single LED 162 but offset from the center of the lenslet. Similar to the middle image of FIG. 24, the the light intensity distribution shows an asymmetrical beam in the (vertical) plane including the length direction of the line of lenslets. Thus, the shifting of the LED position along the groove steers the beam output along the groove length direction.

The bottom image shows the central placement of the LED with respect to the cell 61 and thus shows the symmetrical distribution as discussed above.

Figure 26:
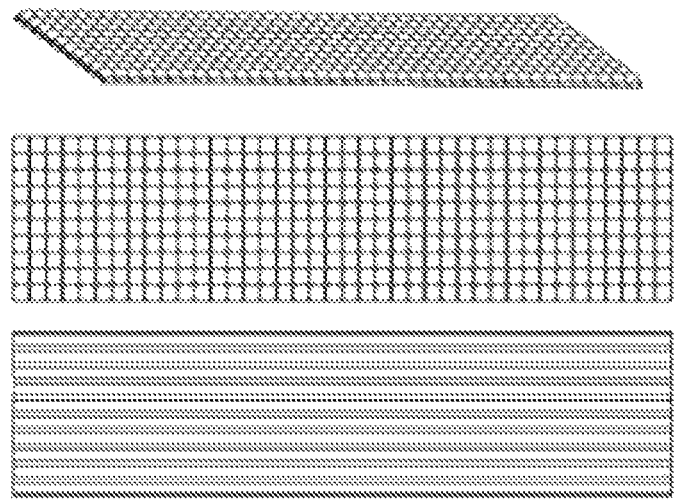
FIG. 26 shows an arrangement with grooves running along the length of the light strip.

The examples above all have the grooves running along the length of the light strip. FIG. 26 shows this arrangement, and shows a perspective view, a view of the first (top) surface showing the cells 61 and a view of the second (bottom) surface, showing the grooves 64.

Figure 27:
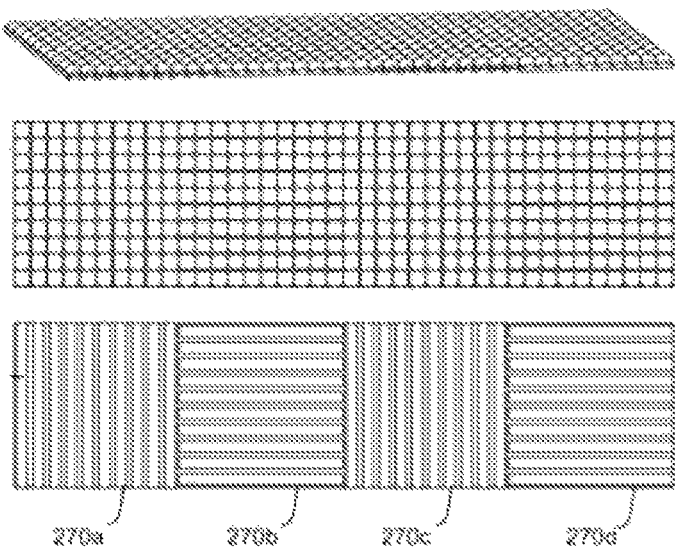
FIG. 27 shows an alternative design in which the grooves are arranged in sub-arrays with grooves in different directions.

FIG. 27 shows an alternative design in which the grooves are arranged in sub-arrays. Four sub-arrays 270a, 270b, 270c, 270d are shown. The first and third sub-arrays 270a, 270c have the grooves running perpendicular to a length direction of the lens plate, and the second and fourth sub-arrays 270b, 270d have the grooves running parallel to the length direction of the lens plate (as in the examples above).

More generally, there is one or more first sub-arrays (270a, 270c) of grooves (64), and one or more second sub-arrays (270b, 270d) of grooves (64). The grooves of each sub-array are parallel to each other, but the grooves of the first sub-array(s) are perpendicular to the grooves of the second sub-array(s).

The invention generally, and also the approach of FIG. 27, is not limited to strip-shaped lens plates.

Figures 28, 29:
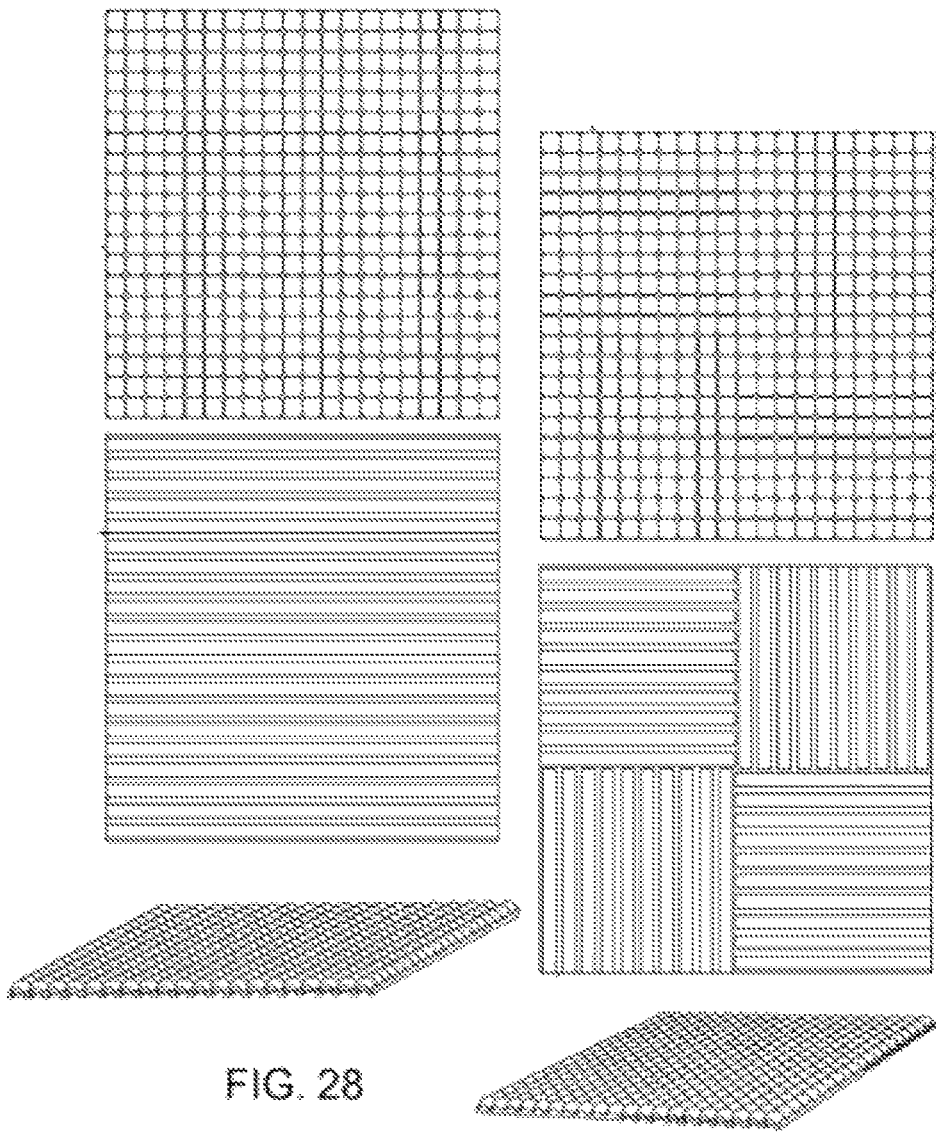
FIG. 28 shows how the invention may be applied to a square lens plate.
FIG. 29 shows how the sub-array of grooves, shown in FIG. 27, may also be applied to a square lens plate.

FIG. 28 shows how the invention may be applied to a square lens plate. It shows a view of the first (top) surface showing the cells 61, a view of the second (bottom) surface, showing the grooves 64, and a perspective view.

FIG. 29 shows how the approach of FIG. 27 may also be applied to a square lens plate. It again shows a view of the first (top) surface showing the cells 61, a view of the second (bottom) surface, showing the grooves 64, and a perspective view. The grooves are again arranged in sub-arrays, one set of sub-arrays having grooves running perpendicular to the grooves of the other set of sub-arrays.

Figure 30:
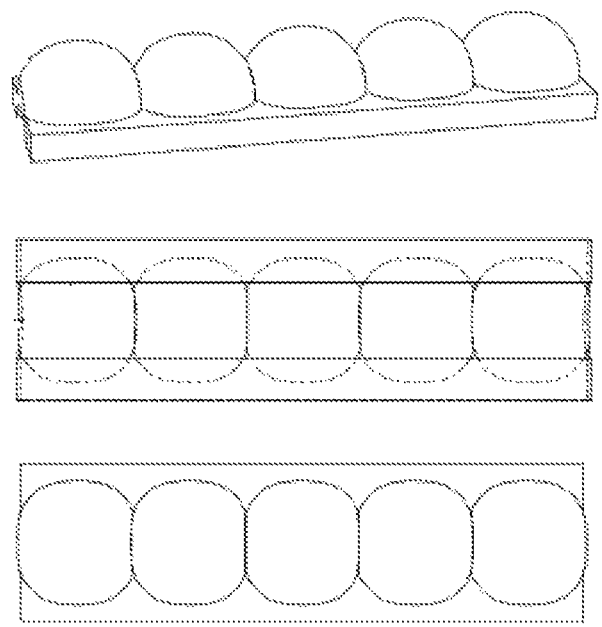
FIG. 30 shows cells which intersect with neighboring cells.

The examples above all show cells which intersect with neighboring cells, at least along the line of cells. This is shown in FIG. 30, which shows a row of five lenslets, in perspective view, bottom view and top view.

Figure 31:
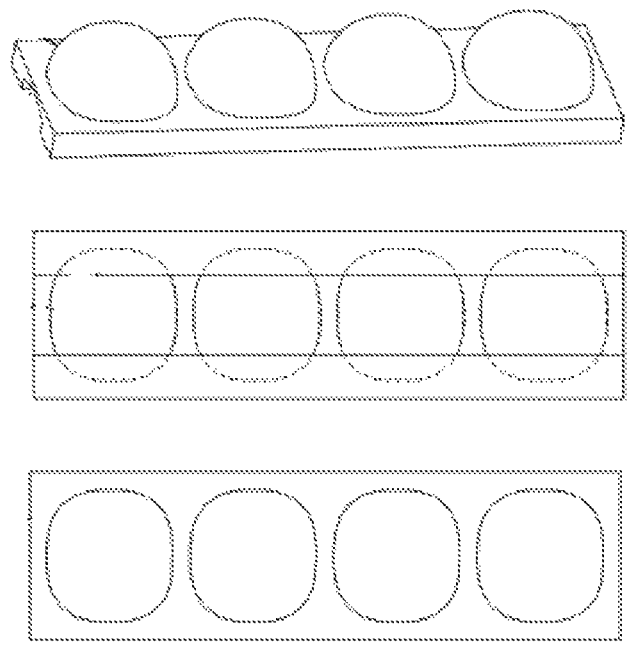
FIG. 31 shows that the cells do not need to intersect with each other, and they may be isolated from each other by a small spacing.

FIG. 31 shows that the cells 61 do not need to intersect with each other, and they may be isolated from each other by a small spacing.

Figure 32:
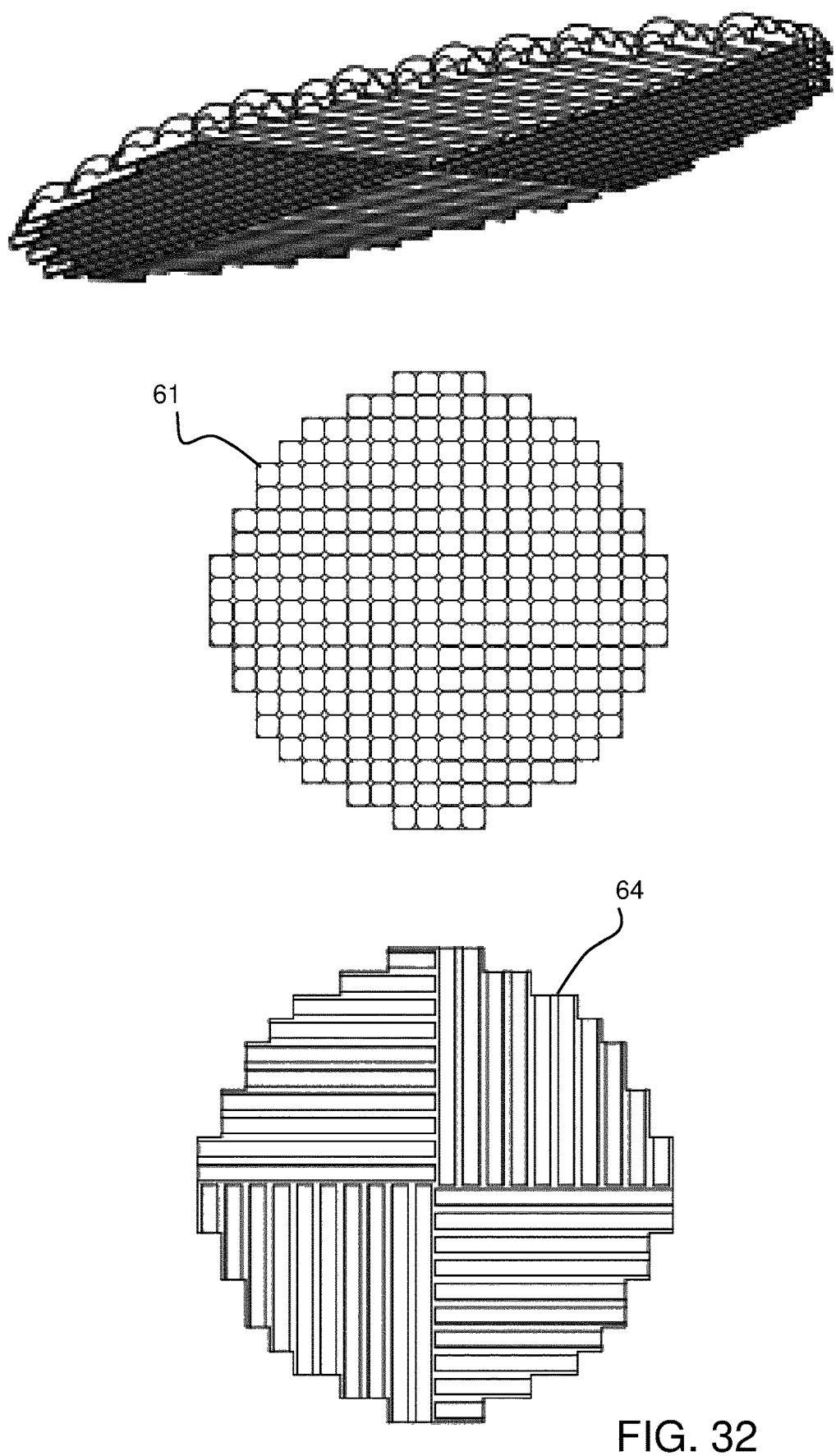
FIG. 32 shows an example of how the invention may be applied to a circular lens plate.

The examples above all show square or rectangular lens plates. The lens plate may have any outer shape, and FIG. 32 shows an example of a circular lens plate.

The top image is a perspective view, the middle image is a top view of the cells 61 and the bottom image is a bottom view of the grooves 64.

The grooves are maintained as straight lines, and in this example, this is achieved based on an arrangement of the grooves into sub-arrays in the manner shown in FIG. 29. Thus, FIG. 32 is basically the design of FIG. 29 with a different outer shape.

The examples above all have grooves and the associated cells formed in straight lines. However, they may instead also follow curved paths. For example, the lens plate may be circular with rings of cells and corresponding rings of grooves.

For a strip lighting approach, the length of the lens plate is for example at least 250 mm and the width is at most 50 mm. The lens plate may thus be long and thin, for example to form a high bay luminaire.

The row pitch is for example in the range 5 mm to 15 mm. However, the invention may be scaled to various sizes.

Figure 33:
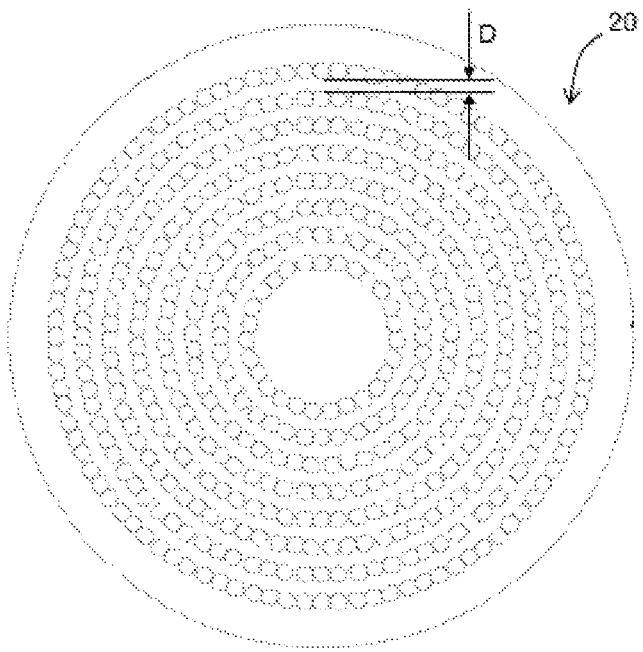
FIG. 33 shows an example of first surface of lens plate in accordance with the invention.
Figure 34:
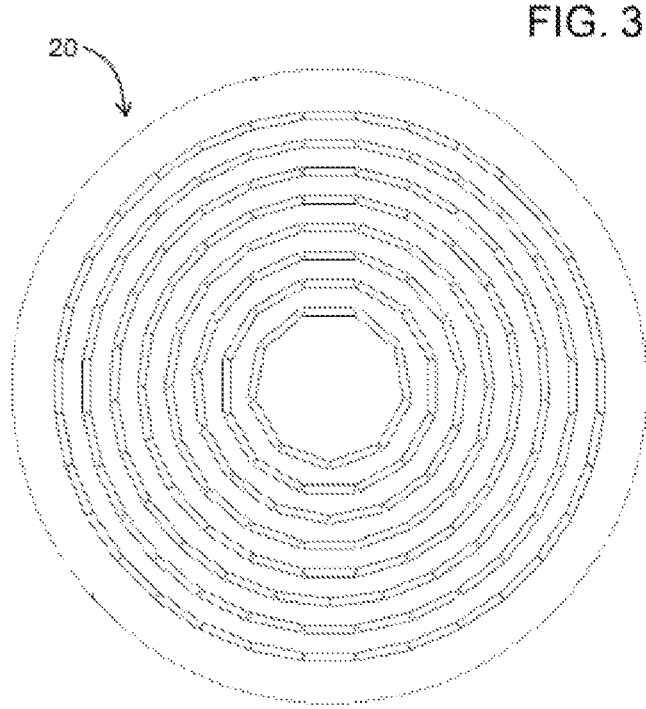
FIG. 34 shows the second surface of the lens plate example of FIG. 33.

FIG. 33 and FIG. 34 show the two surfaces of an example of round lens plate 20. The lenslets 12 are clustered in small segments 63, here three lenslets 12 in a straight row are shown in one segment. The segments are arranged into concentric rings substantially in a circumferential direction, or more accurately, in a tangent direction of the rings. All the segments have a same or at least similar shape: on the first surface 60, protruding cells 61 are illustrated, while on the second surface 62, segmented grooves 64 are illustrated.

Figure 35:
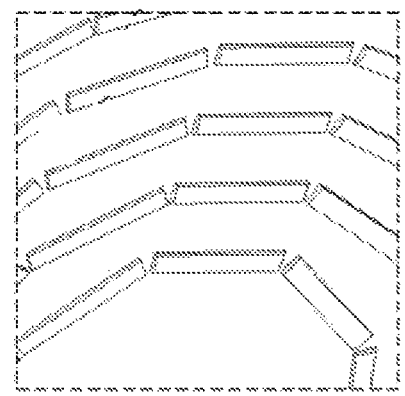
FIG. 35 shows an enlarged perspective view of the second surface in FIG. 34.

FIG. 35 further illustrates an enlarged perspective view of the second surface. For the purpose of a uniform light output, the segments in this example are distributed as close to each other as possible in the circumferential direction, and it is preferable that the distribution is as even as possible. Further, as the rings are formed with circumferentially arranged segments in this example, if there are more than two rings, the distances D (showing in FIG. 33) between two rings are preferably equal or at least similar to each other.

Figure 36:
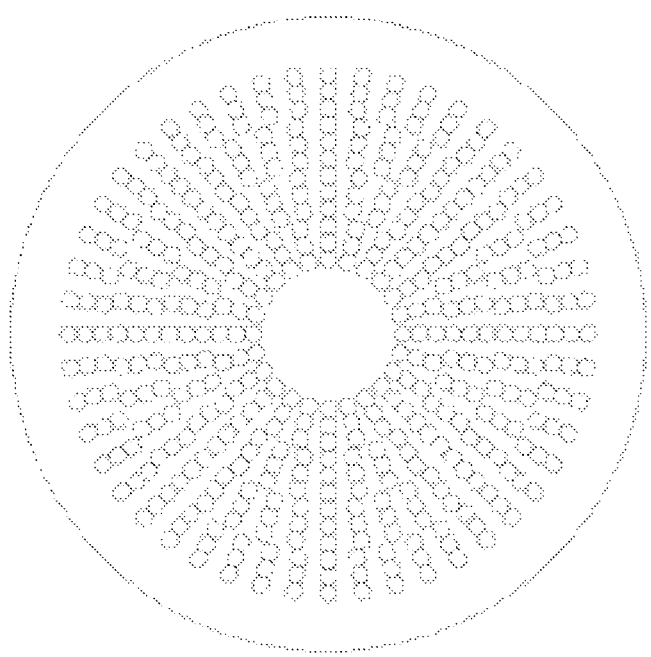
FIG. 36 shows another example of first surface of lens plate in accordance with the invention.
Figure 37:
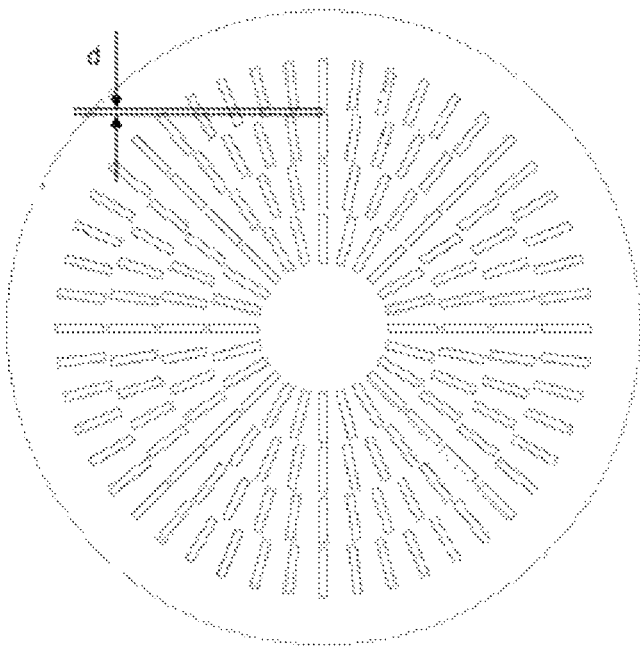
FIG. 37 shows the second surface of the lens plate example of FIG. 36.

FIG. 36 and FIG. 37 show the two surfaces of another example of round lens plate 20. The lenslets 12 are clustered in small segments 63, here three lenslets 12 are shown in one segment. The segments 63 are arranged in a radial direction, but they are also grouped into concentric rings of segments (and hence also concentric rings of lenslets). All the segments have a same or at least similar shape: on the first surface 60, protruding cells 61 are illustrated, while on the second surface 62, segmented grooves 64 are illustrated. For the purpose of a uniform light output, the segments (of different concentric rings) are arranged as evenly as possible on the lens plate 20, relative to each other. Therefore, there are more segments on an outer concentric ring than that on an inner concentric ring. Thereby the spacing of the lenslets is more uniform over the area of the lens plate. As the rings are formed with radially arranged segments in this example, it is preferable that, in the radial direction, the rings are very close to each other, so that there are preferably no (or very small) gaps (which is at most a minor distance d, showing in FIG. 37) in the radial direction between the segments at different radial positions (and hence no, or very small, gaps between adjacent concentric rings of the lenslets on both the first and second surfaces).

In an example of the lens plate 20, the profiles of the cells are in a same or at least similar shape. This greatly reduces the effort needed for designing the optical structure of the lens plate 20. The shape of the cells is preferably a 3D protrusion which means it has a convex surface facing different directions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting unit comprising:
   a carrier;
   an array of LEDs mounted on the carrier; and
   a lens plate with a circular array of lenslets and disposed over the carrier, the lens plate comprising:
      a first surface having a plurality of individual cells, each cell defining one side of a respective lenslet of the array of lenslets; and
      a second surface opposite the first surface and having a set of grooves, each groove defining a second side of the lenslets of the array of lenslets;

wherein the circular array of lenslets include a plurality of concentric rings, each ring formed by a plurality of straight segments comprising at least two of said lenslets arrainged in a row, and at least some of the LEDs are offset from center of an associated cell; or for at least some of the cells, a plurality of LEDs located at different positions along a groove direction and are associated with the same cell.

2. The lighting unit of claim 1, further comprising an optical axis normal to the lens plate, wherein each cell of the lens plate intersects with neighboring cells, and each cell is aligned with a respective groove.

3. The lighting unit of claim 1, wherein light from the array of LEDs enters through the second surface of the lens plate, and exits through the first surface of the lens plate.

4. The lighting unit of claim 1, wherein each of the lenslets each measures less than 8 mm×8 mm.

5. The lighting unit of claim 1, wherein the segments of the lens plate are arranged substantially in a circumferential direction of the rings.

6. The lighting unit of claim 1, wherein the segments of the lens plate extend substantially in a radial direction of the rings.

7. The lighting unit of claim 1, wherein profiles of the cells of the lens plate are substantially the same.

8. The lighting unit of claim 1, wherein each of the cells of the lens plate has a convex surface facing in both a circumferential and a radial direction of the lens plate.

9. The lighting unit of claim 1, wherein the number of LEDs in the array of LEDs is the same as the number of lenslets in the lens plate, with each of the LEDs faceing a corresponding lenslet.

10. The lighting unit of claim 1, wherein the LEDs of the array of LEDs are associated with one of:

a sub-set of the segments of lenslets;

a sub-set of the rings of lenslets; or all of the segments of lenslets but with each segment of LEDs having LEDs associated with only a subset of the lenslets of a corresponding segment of lenslets.

11. A luminaire comprising the lighting unit of claim 1 and a LED driver.

12. The lighting unit of claim 1, wherein the LEDs of the array of LEDs are associated with a subset of the array of lenslets of the lens plate.

13. A high bay luminaire comprising the luminaire of claim 12 and a housing.

* * * * *